(12) United States Patent
Fu et al.

(10) Patent No.: US 12,354,774 B2
(45) Date of Patent: Jul. 8, 2025

(54) POSITIVE TEMPERATURE COEFFICIENT CERAMIC THERMISTOR ELEMENT HAVING STRONG REDUCING ATMOSPHERE RESISTANCE AND PREPARATION METHOD THEREFOR

(71) Applicant: JIANGSU NEW LINZHI ELECTRONIC TECHNOLOGY CO., LTD., Jiangsu (CN)

(72) Inventors: Qiuyun Fu, Jiangsu (CN); Zhengan He, Jiangsu (CN); Dongxiang Zhou, Jiangsu (CN)

(73) Assignee: JIANGSU NEW LINZHI ELECTRONIC TECHNOLOGY CO., LTD., Jiangsu (CN)

( * ) Notice: Subject to any disclaimer, the term of this patent is extended or adjusted under 35 U.S.C. 154(b) by 156 days.

(21) Appl. No.: 18/281,762

(22) PCT Filed: Jul. 7, 2021

(86) PCT No.: PCT/CN2021/104885
§ 371 (c)(1),
(2) Date: Sep. 12, 2023

(87) PCT Pub. No.: WO2022/151673
PCT Pub. Date: Jul. 21, 2022

(65) Prior Publication Data
US 2024/0312678 A1    Sep. 19, 2024

(30) Foreign Application Priority Data
Jan. 13, 2021    (CN) .......................... 202110039475.1

(51) Int. Cl.
*H01C 7/02*    (2006.01)
*C04B 37/02*    (2006.01)
*H01C 1/14*    (2006.01)

(52) U.S. Cl.
CPC .......... *H01C 7/021* (2013.01); *C04B 37/023* (2013.01); *C04B 37/028* (2013.01);
(Continued)

(58) Field of Classification Search
CPC .... H01C 7/021; H01C 1/1406; C04B 37/023; C04B 37/028
See application file for complete search history.

(56) References Cited

U.S. PATENT DOCUMENTS 3,996,447 A * 12/1976 Bouffard .................. H05B 3/06
219/505
5,547,907 A *  8/1996 Katsumata ............. H01C 7/102
501/76
(Continued)

FOREIGN PATENT DOCUMENTS

CN    2537109    2/2003    ............... H01C 7/02
CN    1487534    4/2004    ............... H01C 7/02
(Continued)

OTHER PUBLICATIONS

International Search Report and Written Opinion issued in PCT/CN2021/104885, dated Sep. 6, 2021, with translation, 16 pgs.
(Continued)

*Primary Examiner* — Kyung S Lee
(74) *Attorney, Agent, or Firm* — HAYES SOLOWAY P.C.

(57) ABSTRACT

A positive temperature coefficient ceramic thermistor element includes a sintered thermosensitive ceramic piece that uses lead barium titanate as a base, as well as metal ohmic electrodes which are positioned on two side surfaces of the thermosensitive ceramic piece. The thermistor element has a microporous channel barrier layer, and includes a glass sealing layer which wraps the outer surface of the thermosensitive ceramic piece, or an organic matter sealant which fills and blocks micro-pores in the surfaces of the metal
(Continued)

ohmic electrodes combined on the two side surfaces of the thermosensitive ceramic piece and, at the same time, blocks gaps in the surfaces of areas, that do not have the metal ohmic electrodes, of a peripheral edge of the thermosensitive ceramic piece.

8 Claims, 3 Drawing Sheets (52) U.S. Cl.
CPC ........ *H01C 1/1406* (2013.01); *C04B 2237/10* (2013.01); *C04B 2237/346* (2013.01); *C04B 2237/74* (2013.01)

(56) References Cited

U.S. PATENT DOCUMENTS

| | | | | |
|---|---|---|---|---|
| 6,791,163 | B2* | 9/2004 | Kishimoto | H01C 7/18 257/532 |
| 8,339,237 | B2* | 12/2012 | Kajino | C04B 38/0615 338/307 |
| 9,530,547 | B2* | 12/2016 | Aoto | H01C 7/021 |
| 2004/0048052 | A1 | 3/2004 | Kishimoto et al. | B32B 3/00 |
| 2012/0056709 | A1 | 3/2012 | Kajino et al. | H01C 7/13 |
| 2015/0325369 | A1* | 11/2015 | Inoue | H01C 7/04 336/200 |

FOREIGN PATENT DOCUMENTS

| | | | |
|---|---|---|---|
| CN | 101354935 | 1/2009 | ............... H01C 7/02 |
| CN | 102194559 | 9/2011 | ............... H01C 7/04 |
| CN | 102403077 | 4/2012 | ............... H01C 7/02 |
| CN | 102522169 | 6/2012 | ............... H01C 1/14 |
| CN | 104969307 | 10/2015 | ............... H01C 7/10 |
| CN | 104987729 | 10/2015 | ............. C08K 13/02 |
| CN | 106448974 | 2/2017 | ............... H01C 7/10 |
| CN | 207038271 | 2/2018 | ............... H01C 7/02 |
| CN | 112802647 | 5/2021 | ............... H01C 7/02 |
| JP | 2008251692 | 10/2008 | ............... H01C 7/02 |

OTHER PUBLICATIONS

International Preliminary Report on Patentability issued in PCT/CN2021/104885, dated Jul. 4, 2023, 5 pgs.

* cited by examiner

POSITIVE TEMPERATURE COEFFICIENT CERAMIC THERMISTOR ELEMENT HAVING STRONG REDUCING ATMOSPHERE RESISTANCE AND PREPARATION METHOD THEREFOR

TECHNICAL FIELD

The present invention belongs to the technical field of electronic components and preparation thereof, in particular to a positive temperature coefficient ceramic thermistor element having strong reducing atmosphere resistance and a preparation method thereof.

BACKGROUND ART

Positive temperature coefficient (which is hereinafter referred to as PTC) ceramic thermo-sensitive elements are usually prepared from semiconductor ceramic materials based on barium titanate. A characteristic of such a thermo-sensitive element is that the resistance of the thermo-sensitive element at room temperature will increase by several orders of magnitude when the temperature exceeds the Curie temperature, which is to say, a so-called PTC effect will occur. The PTC effect is originated from the grain boundary barrier, and the height of the grain boundary barrier is closely related to the concentration of oxygen atoms adsorbed on the grain boundary. When the thermo-sensitive element operates in a harsh environment such as a reducing atmosphere for a long time, loss of oxygen at the grain boundary will occur, resulting in compromised element performance or even loss of the PTC effect. Generally, PTC thermo-sensitive elements used in new energy vehicles, air-conditioning, electric auxiliary heating and other fields often operate in such environments. On one hand, the workplace (e.g., a vehicle) is in a harsh environment; on the other hand, when the PTC elements are assembled into a heating component, they are usually fixed on a metal radiator with organic adhesive, and such organic adhesive will give off a reducing atmosphere at high temperatures ($\geq 200°$ C.) and cause damages to the PTC elements, consequently reducing the service life of the components.

PTC thermo-sensitive element may be easily affected by a harsh environment mainly because they are a polycrystalline ceramic material, which has not only grain boundaries but also a large quantity of micropores, through which various kinds of adverse gasses may enter the grain boundaries, thus compromising the macro-electrical properties of the elements, such as loss of automatic temperature control function, owing to oxidation and reduction.

SUMMARY OF THE INVENTION

A first object of the present invention is to provide a positive temperature coefficient ceramic thermistor element having strong reducing atmosphere resistance, which is helpful for preventing external harmful gasses from invading the channels of ceramic grain boundaries through the micropores in the ceramic surface, thereby improving the ability of resisting harsh environments and prolonging the service life, and meeting the requirement for service in environments containing a reducing atmosphere.

A second object of the present invention is to provide a method for preparing a positive temperature coefficient ceramic thermistor element having strong reducing atmosphere resistance, the method involves a simple preparation process, doesn't involve any extremely harsh process element, thereby meets the requirements of industrial preparation, and can ensure that the technical effects of the obtained positive temperature coefficient ceramic thermistor element can be fully achieved.

The first object of the present invention is attained with the following technical solution: a positive temperature coefficient ceramic thermistor element having strong reducing atmosphere resistance, comprising a barium lead titanate-based and sintered thermal sensitive ceramic plate and metal ohmic electrodes located at two sides of the thermal sensitive ceramic plate, wherein the positive temperature coefficient ceramic thermistor element further comprises a microporous channel barrier layer, the microporous channel barrier layer comprises a glass sealing layer or an organic sealant, and, in the case that the microporous channel barrier layer is a glass sealing layer, the glass sealing layer is cladded on the outer surfaces of the thermal sensitive ceramic plate entirely, and the metal ohmic electrodes are bonded to the two sides of the glass sealing layer; whereas in the case that the microporous channel barrier layer is an organic sealant, the organic sealant is filled in micropores in the surfaces of the metal ohmic electrodes bonded to the two sides of the thermal sensitive ceramic plate, and seals the voids in the surfaces of peripheral edge regions of the thermal sensitive ceramic plate where no metal ohmic electrode is arranged at the same time.

In a specific embodiment of the present invention, the composition of raw material of the thermal sensitive ceramic plate comprises: $(1-x-y)BaTiO_3 + xPbTiO_3 + yR + zS + wT$, where R is CaO, SrO or (CaO+SrO), S is $(BN+V_2O_5 + Li_2CO_3 + Al_2O_3)$, and T is one of trivalent rare earth oxide and pentavalent metal oxide or a combination thereof; and $x<0.5$, $y<0.1$, $z<0.05$ and $w=0.001$ to $0.005$.

In another specific embodiment of the present invention, the composition of the raw material of the thermal sensitive ceramic plate further comprises 0.0001 to 0.0005 mol $MnN_2O_6$, $NiN_2O_6$ or $FeN_3O_9$.

In another specific embodiment of the present invention, the trivalent rare earth oxide is one of $La_2O_3$, $Y_2O_3$ and $Sm_2O_3$ or a mixture thereof; and the pentavalent metal oxide is $Nb_2O_5$.

In yet another specific embodiment of the present invention, the glass sealing layer is obtained from glass paste for cladding, the glass paste for cladding is prepared as follows: preparing glass micro-powder in particle size smaller than 500 nm through a melting and water quenching process, and an organic substance is added therein and mixed, so as to obtain the glass paste for cladding for the glass sealing layer that is used as the microporous channel barrier layer.

In still yet another specific embodiment of the present invention, a mass ratio of the glass micro-powder in particle size smaller than 500 nm to the organic substance is 1:1.2, and the organic substance consists of the following raw materials in parts by weight (pbw): 0.1 to 0.3 pbw adhesive, 0.001 to 0.01 pbw dispersant, and 1 pbw solvent; the adhesive is PVB, the dispersant is low molecular wax, and the solvent is acetone.

In still yet another specific embodiment of the present invention, after the glass paste for cladding is cladded on the surface of the thermal sensitive ceramic plate by either of the impregnation method or the spraying method, the thermal sensitive ceramic plate is placed in a high-temperature heat treatment device and heat-treated at 500 to 600° C. for 8 to 12 minutes.

In still yet another specific embodiment of the present invention, the glass sealing layer is a glass sealing layer of a glass system, the glass system consists of the following raw materials at the following molar ratio: $K_2SiF_6+ZnO+Al_2O_3+SiO_2+\alpha M+N+\beta P$, where M is $Na_2O+K_2O$ and $\alpha=0.1$ to 0.3; N is one of $B_2O_3$, $Li_2O$ and $V_2O_5$ or a combination thereof, and the total amount is one mole; P is $MnO_2$, $Fe_3O_4$ or $Co_3O_4$, and $\beta=0.001$ to 0.01.

In still yet another specific embodiment of the present invention, the filling and sealing method for filling and sealing the organic sealant in the micropores in the surfaces of the metal ohmic electrodes bonded to the two sides of the thermal sensitive ceramic plate and filling and sealing the voids in the surfaces of peripheral edge regions of the thermal sensitive ceramic plate where no metal ohmic electrode is arranged at the same time comprises either method of the following two methods: the first method: placing the thermal sensitive ceramic plate with the metal ohmic electrodes bonded on the two sides thereof into a hot isostatic press containing the organic sealant as a void sealing medium, applying pressure to the hot isostatic press, controlling the temperature of the void sealing medium as the pressure is applied, the applied pressure and the duration for applying pressure, and cleaning and drying the surfaces sequentially after the pressure application is finished; the second method: impregnating the thermal sensitive ceramic plate with the metal ohmic electrodes bonded on the two sides in a container that contains the organic sealant, vacuumizing the container, controlling the degree of vacuum for vacuumizing the container and the impregnation duration, taking the ceramic plate out of the container after the vacuumizing, and cleaning and drying the surfaces sequentially.

In still yet another specific embodiment of the present invention, controlling the temperature of the void sealing medium during the application of pressure is that the temperature of the void sealing medium is controlled to be 100 to 200° C., controlling the applied pressure is that the pressure is controlled to be 1 to 10 MPa, and controlling the duration of applying pressure is that the duration for applying pressure is controlled to be 60 to 120 min.; controlling the degree of vacuum during the vacuumizing is that the degree of vacuum is controlled to be smaller than 10 KPa, and controlling the impregnation duration is that the impregnation duration is controlled to be 280 to 320 min.; and the surface cleaning is carried out with an ultrasonic cleaning machine.

In still yet another specific embodiment of the present invention, the composition of raw materials of organic sealant comprises: polydimethylsiloxane, nano-powder of a transition metal oxide, a crosslinking agent, a catalyst, and an organic solvent; the nano-powder of the transition metal oxide added into the polydimethylsiloxane is in an amount equal to 0.001-0.01% of the weight of the polydimethylsiloxane; the crosslinking agent is added in an amount equal to 1-3% of the weight of the polydimethylsiloxane; and the catalyst is added in an amount equal to 0.05-0.1% of the weight of the polydimethylsiloxane.

In still yet another specific embodiment of the present invention, the nano-powder of the transition metal oxide is nano-powder of $MnO_2$, $Fe_3O_4$ or $Co_3O_4$; the crosslinking agent is hydrogen silicone oil; the catalyst is a platinum ethylene complex; and the organic solvent is xylene.

In still yet another specific embodiment of the present invention, the glass sealing layer is in thickness of 2 to 5 μm.

The second object of the present invention is attained with the following technical solution: a method for preparing a positive temperature coefficient ceramic thermistor element having strong reducing atmosphere resistance, comprising: first, cladding a glass sealing layer as a microporous channel barrier layer on the outer surfaces of a barium lead titanate-based and sintered thermal sensitive ceramic plate, and then bonding metal ohmic electrodes on the two sides of the glass sealing layer respectively; or, first, bonding metal ohmic electrodes on the two sides of the barium lead titanate-based thermal sensitive ceramic plate, and then filling and sealing an organic sealant serving as a microporous channel barrier layer in the micropores in the surfaces of the metal ohmic electrodes, and sealing the voids in the surfaces of the peripheral edge regions of the thermal sensitive ceramic plate where no metal ohmic electrode is arranged at the same time, so as to obtain the positive temperature coefficient ceramic thermistor element having strong reducing atmosphere resistance.

The technical solution provided by the present invention have the following technical effects: a glass sealing layer or an organic sealant is used as the microporous channel barrier layer for sealing the microporous channels produced in the barium lead titanate-based and sintered thermal sensitive ceramic plate; in the case that a glass sealing layer is used, the glass sealing layer is cladded on the outer surfaces of the thermal sensitive ceramic plate entirely, and metal ohmic electrodes are bonded to the two sides of the glass sealing layer; in the case that an organic sealant is used, the organic sealant is filled in the micropores in the surfaces of the metal ohmic electrodes bonded to the two sides of the thermal sensitive ceramic plate, and the voids in the surfaces of the peripheral edge regions of the thermal sensitive ceramic plate, where no metal ohmic electrode is arranged, are filled at the same time, thereby external harmful gasses and/or attached foreign substances are isolated from the grain boundaries of the thermal sensitive ceramic plate, and the loss of automatic temperature control function and even electrical short circuit caused by reduction can be avoided. Thus, the ability of resisting harsh environments can be significantly improved, and the service life of the component can be prolonged; in addition, the requirements for use of the components in devices that contain a reducing atmosphere, such as the thermal management systems of new energy vehicles, and the electric auxiliary constant-temperature heaters of household appliances such as air conditioners and the like, can be met, and the requirements for the reliability and expected service of related heaters can be improved; the preparation method provided by the present invention employs simple process steps, doesn't involve any harsh process element, and can ensure that the technical effects of the positive temperature coefficient ceramic thermistor element can be fully achieved.

EMBODIMENTS

Example 1

Figure 1:
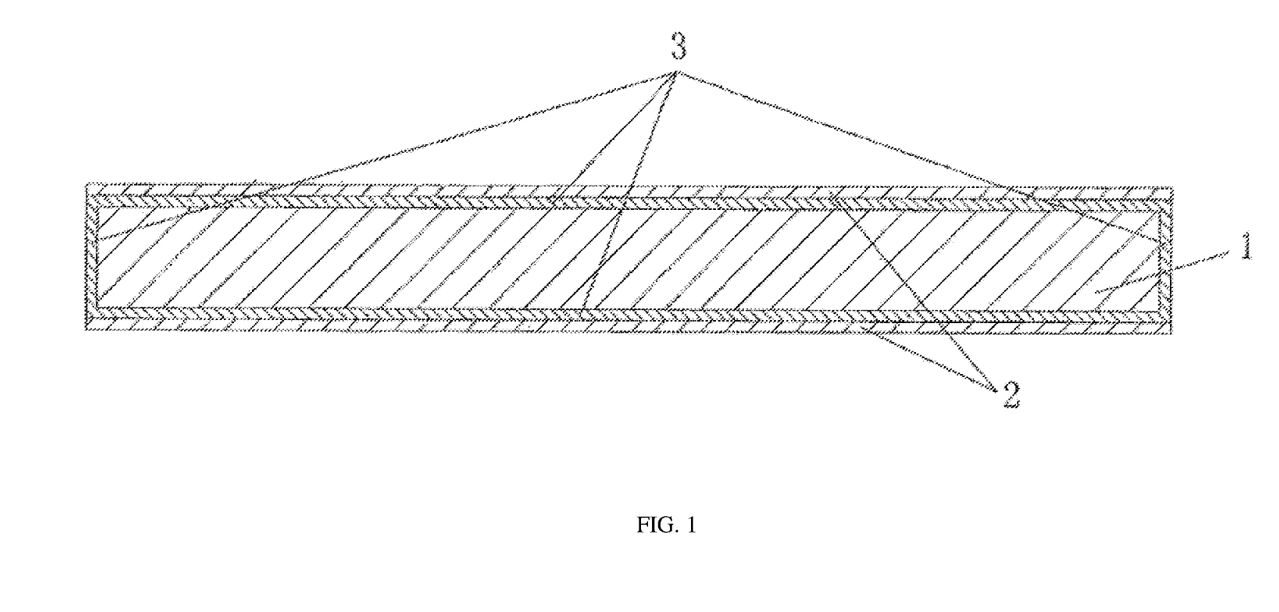
FIG. 1 is a cross-sectional view of the positive temperature coefficient ceramic thermistor element having strong reducing atmosphere resistance in Examples 1-3 of the present invention.

Please see FIG. 1. The positive temperature coefficient ceramic thermistor element having strong reducing atmosphere resistance in FIG. 1 comprises a barium lead titanate-based and sintered thermal sensitive ceramic plate 1 in size of 24×15×2.4 mm (but not limited to the exemplary size) and metal ohmic electrodes 2 located at two sides of the thermal sensitive ceramic plate 1. As a technical key point of the technical solution provided by the present invention, the positive temperature coefficient ceramic thermistor element further comprises a microporous channel barrier layer 3, and, in this example, the microporous channel barrier layer 3 is a glass sealing layer entirely cladded in thickness of 5 μm on the outer surfaces of the thermal sensitive ceramic plate 1; the metal ohmic electrodes 2 are preferably made of aluminum, copper, silver-zinc alloy or base metal, but are not absolutely limited to those materials; in addition, the metal ohmic electrodes 2 may be bonded to the two sides of the glass sealing layer that serves as the microporous channel barrier layer 3 by infiltration sintering, melt spraying, sputtering, plating or other similar equivalent methods.

In this example, the raw material composition of the above-mentioned thermal sensitive ceramic plate 1 comprises: $0.64$ mol $BaTiO_3 + 0.3$ mol $PbTiO_3 + 0.06$ mol $(CaO+SrO) + 0.005$ mol $(BN+V_2O_3+Li_2CO_3+Al_2O_3) + 0.003$ mol $La_2O_3 + 0.0003$ mol $MnN_2O_6$.

In this example, the glass sealing layer is obtained (i.e., produced) from glass paste for cladding, the glass paste for cladding is prepared as follows: preparing glass micro-powder in particle size smaller than 500 nm through a melting and water quenching process, and an organic substance (may also be referred to as an "adhesive" or an "organic adhesive") is added therein and mixed at the same time, so as to obtain the glass paste for cladding for the glass sealing layer that is used as the microporous channel barrier layer 3. The mass ratio of the glass micro-powder in particle size smaller than 500 nm to the organic substance is 1:1.2, and the organic substance consists of the following raw materials in parts by weight (pbw): 0.2 pbw PVB as an adhesive, 0.001 pbw low molecular wax as a dispersant, and acetone as a solvent; there is no restriction on the amount of the solvent, because the solvent may be added as required.

In this example, first, the glass paste for cladding is cladded on the surfaces of the thermal sensitive ceramic plate 1 by impregnation, then, the thermal sensitive ceramic plate 1 is placed in a high-temperature heat treatment device and heat-treated at 500° C. for 12 min.

In this example, the glass sealing layer is a glass sealing layer of a glass system, and the glass system consists of the following raw materials at the following molar ratio: $K_2SiF_6 + ZnO + Al_2O_3 + SiO_2 + 0.2\ (Na_2O+K_2O) + 0.5\ (B_2O_3+Li_2O) + 0.005\ Fe_3O_4$, and the total amount is one mole.

Example 2

Please see FIG. 1. The positive temperature coefficient ceramic thermistor element having strong reducing atmosphere resistance in FIG. 1 comprises a barium lead titanate-based and sintered thermal sensitive ceramic plate 1 in size of 24×15×2.4 mm (but not limited to the exemplary size) and metal ohmic electrodes 2 located at two sides of the thermal sensitive ceramic plate 1. As a technical key point of the technical solution provided by the present invention, the positive temperature coefficient ceramic thermistor element further comprises a microporous channel barrier layer 3, and, in this example, the microporous channel barrier layer 3 is a glass sealing layer entirely cladded in thickness of 2 μm on the outer surfaces of the thermal sensitive ceramic plate 1; the metal ohmic electrodes 2 are preferably made of aluminum, copper, silver-zinc alloy or base metal, but are not absolutely limited to those materials; in addition, the metal ohmic electrodes 2 may be bonded to the two sides of the glass sealing layer that serves as the microporous channel barrier layer 3 by infiltration sintering, melt spraying, sputtering, plating or other similar equivalent methods.

In this example, the raw material composition of the above-mentioned thermal sensitive ceramic plate 1 comprises: $0.897$ mol $BaTiO_3 + 0.003$ mol $PbTiO_3 + 0.1$ mol $CaO + 0.05$ mol $(BN+V_2O_3+Li_2CO_3+Al_2O_3) + 0.001$ mol $Y_2O_3 + 0.001$ mol $Nb_2O_5 + 0.0001$ mol $NiN_2O_6$.

In this example, the glass sealing layer is obtained (i.e., produced) from glass paste for cladding, the glass paste for cladding is prepared as follows: preparing glass micro-powder in particle size smaller than 500 nm through a melting and water quenching process, and an organic substance (may also be referred to as an "adhesive" or an "organic adhesive") is added therein and mixed at the same time, so as to obtain the glass paste for cladding for the glass sealing layer that is used as the microporous channel barrier layer 3. The mass ratio of the glass micro-powder in particle size smaller than 500 nm to the organic substance is 1:1.2, and the organic substance consists of the following raw materials in parts by weight (pbw): 0.1 pbw PVB as an adhesive, 0.006 pbw low molecular wax as a dispersant, and acetone as a solvent; there is no restriction on the amount of the solvent, because the solvent may be added as required.

In this example, the glass paste for cladding is cladded on the surfaces of the thermal sensitive ceramic plate 1 by impregnation, and then, the thermal sensitive ceramic plate 1 is placed in a high-temperature heat treatment device and heat-treated at 600° C. for 8 min.

In this example, the glass sealing layer is a glass sealing layer of a glass system, the glass system consists of the following raw materials at the following molar ratio: $K_2SiF_6 + ZnO + Al_2O_3 + SiO_2 + 0.1\ (Na_2O+K_2O) + 0.5\ Li_2O + 0.01\ MnO_2$, and the total amount is one mole.

Example 3

Please see FIG. 1. The positive temperature coefficient ceramic thermistor element having strong reducing atmosphere resistance in FIG. 1 comprises a barium lead titanate-based and sintered thermal sensitive ceramic plate 1 in size of 24×15×2.4 mm (but not limited to the exemplary size) and metal ohmic electrodes 2 located at two sides of the thermal sensitive ceramic plate 1. As a technical key point of the technical solution provided by the present invention, the positive temperature coefficient ceramic thermistor element further comprises a microporous channel barrier layer 3, and, in this example, the microporous channel barrier layer 3 is a glass sealing layer entirely cladded in thickness of 3.5 μm on the outer surfaces of the thermal sensitive ceramic plate 1; the metal ohmic electrodes 2 are preferably made of aluminum, copper, silver-zinc alloy or base metal, but are not absolutely limited to those materials; in addition, the metal ohmic electrodes 2 may be bonded to the two sides of the glass sealing layer that serves as the microporous channel barrier layer 3 by infiltration sintering, melt spraying, sputtering, plating or other similar equivalent methods.

In this example, the raw material composition of the above-mentioned thermal sensitive ceramic plate 1 comprises: 0.498 $BaTiO_3$+0.5 $PbTiO_3$+0.002 SrO+0.01 (BN+ $V_2O_3$+$Li_2CO_3$+$Al_2O_3$)+0.0025 $Y_2O_3$+0.0025 $Sm_2O_3$+ 0.0003 mol $FeN_3O_9$.

In this example, the glass sealing layer is obtained (i.e., produced) from glass paste for cladding, the glass paste for cladding is prepared as follows: preparing glass micro-powder in particle size smaller than 500 nm through a melting and water quenching process, and an organic substance (may also be referred to as an "adhesive" or an "organic adhesive") is added therein and mixed at the same time, so as to obtain the glass paste for cladding for the glass sealing layer that is used as the microporous channel barrier layer 3. The mass ratio of the glass micro-powder in particle size smaller than 500 nm to the organic substance is 1:1.2, and the organic substance consists of the following raw materials in parts by weight (pbw): 0.3 pbw PVB as an adhesive, 0.01 pbw low molecular wax as a dispersant, and acetone as a solvent; there is no restriction on the amount of the solvent, because the solvent may be added as required.

In this example, the glass paste for cladding is cladded on the surfaces of the thermal sensitive ceramic plate 1 by spraying, and then the thermal sensitive ceramic plate 1 is placed in a high-temperature heat treatment device and heat-treated at 550° C. for 10 min.

In this example, the glass sealing layer is a glass sealing layer of a glass system, the glass system consists of the following raw materials at the following molar ratio: $K_2SiF_6$+ZnO+$Al_2O_3$+$SiO_2$+0.3 ($Na_2O$+$K_2O$)+0.5 $V_2O_5$+ 0.055 $CO_3O_4$, and the total amount is one mole.

Preparation Example (i.e., Preparation Method 1)

First, a glass sealing layer that serves as a microporous channel barrier layer 3 is cladded on the outer surfaces of the barium lead titanate-based and sintered thermal sensitive ceramic plate 1 described in any of the Examples 1-3 entirely, and then metal ohmic electrodes 2 are bonded to the two sides of the glass sealing layer respectively, so as to obtain the positive temperature coefficient ceramic thermistor element having strong reducing atmosphere resistance as shown in FIG. 1.

Example 4

Figure 2:
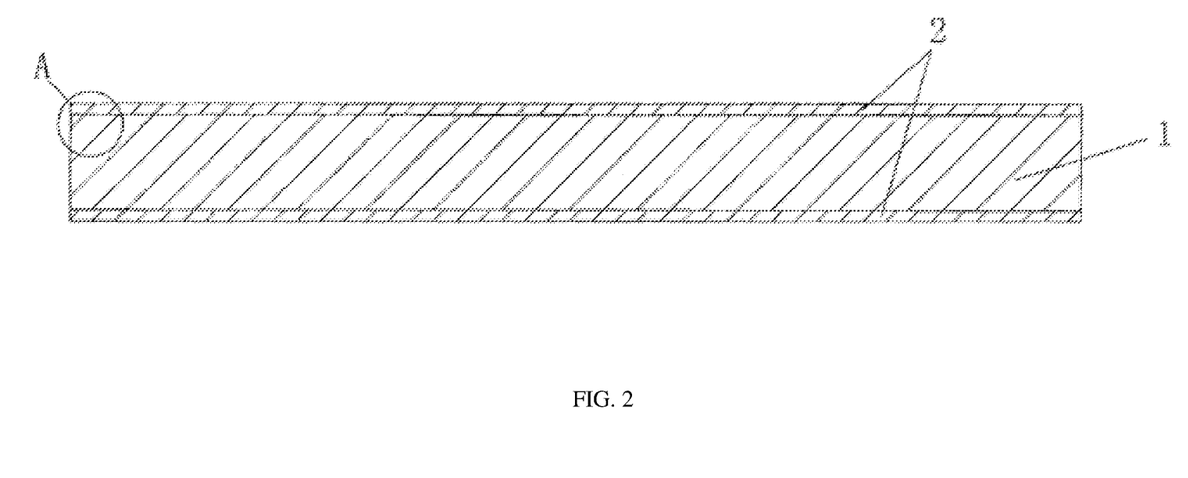
FIG. 2 is a cross-sectional view of the positive temperature coefficient ceramic thermistor element having strong reducing atmosphere resistance in Examples 4-7 of the present invention.
Figure 3:
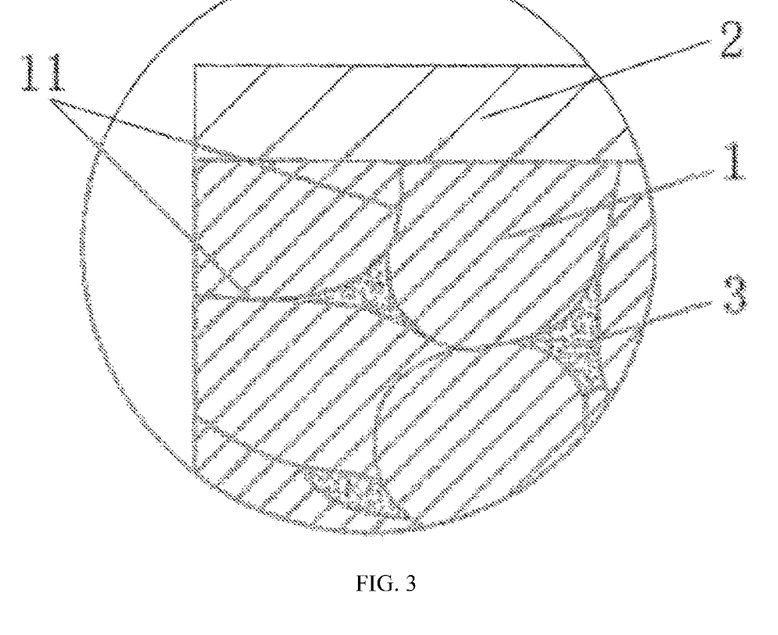
FIG. 3 is an enlarged view of the portion A shown in FIG. 2.

Please see FIGS. 2 and 3. Compared with the example 1, 2 or 3, in the example 4, the microporous channel barrier layer 3 is an organic sealant, and the organic sealant is filled in micropores in the surfaces of the metal ohmic electrodes 2 bonded to the two sides of the thermal sensitive ceramic plate 1, and the voids 11 (shown in FIG. 3) in the surfaces of peripheral edge regions of the thermal sensitive ceramic plate 1, where no metal ohmic electrode 2 is arranged, are sealed (that is, "filled and sealed") at the same time. In this example, the filling and sealing method for filling organic sealant in the micropores in the surfaces of the metal ohmic electrodes 2 bonded to the two sides of the thermal sensitive ceramic plate 1, and sealing the voids 11 in the surfaces of the peripheral edge regions of the thermal sensitive ceramic plate 1 where no metal ohmic electrode 2 is arranged at the same time is as follows: placing the thermal sensitive ceramic plate 1 with the metal ohmic electrodes 2 bonded on the two sides thereof into a hot isostatic press that contains the organic sealant as a void sealing medium, and applying pressure to the hot isostatic press, with the following process parameters: the temperature of the void sealing medium is controlled to be 200° C., the applied pressure is controlled to be 10 MPa, and the applied duration is controlled to be 60 min.; then cleaning and drying the surfaces sequentially after the pressure application is finished. In this example, the raw materials of the organic sealant include: polydimethylsiloxane, nano-powder of a transition metal oxide (i.e., $MnO_2$ nano-powder), a crosslinking agent (i.e., hydrogen silicone oil), a catalyst (i.e., a platinum ethylene complex) and an organic solvent (i.e., xylene), wherein the $MnO_2$ nano-powder added to the polydimethylsiloxane is in an amount equal to 0.001% of the weight of the polydimethylsiloxane, the hydrogen silicone oil is added in an amount equal to 2% of the weight of the polydimethylsiloxane, and the platinum ethylene complex is added in an amount equal to 0.08% of the weight of the polydimethylsiloxane. The rest are the same as those in the examples 1-3.

Example 5

Please see FIGS. 2 and 3. Compared with the example 1, 2 or 3, in the example 5, the microporous channel barrier layer 3 is an organic sealant, and the organic sealant is filled in micropores in the surfaces of the metal ohmic electrodes 2 bonded to the two sides of the thermal sensitive ceramic plate 1, and the voids 11 (shown in FIG. 3) in the surfaces of peripheral edge regions of the thermal sensitive ceramic plate 1, where no metal ohmic electrode 2 is arranged, are sealed (that is, "filled and sealed") at the same time. In this example, the filling and sealing method for filling organic sealant in the micropores in the surfaces of the metal ohmic electrodes 2 bonded to the two sides of the thermal sensitive ceramic plate 1, and sealing the voids 11 in the surfaces of the peripheral edge regions of the thermal sensitive ceramic plate 1, where no metal ohmic electrode 2 is arranged at the same time is as follows: placing the thermal sensitive ceramic plate 1 with the metal ohmic electrodes 2 bonded on the two sides thereof into a hot isostatic press that contains the organic sealant as a void sealing medium, and applying pressure to the hot isostatic press, with the following process parameters: the temperature of the void sealing medium is controlled to be 150° C., the applied pressure is controlled to be 6 MPa, and the applied duration is controlled to be 90 min.; then cleaning and drying the surfaces sequentially after the pressure application is finished. In this example, the raw materials of the organic sealant include: polydimethylsiloxane, nano-powder of a transition metal oxide (i.e., $Fe_3O_4$ nano-powder), a crosslinking agent (i.e., hydrogen silicone oil), a catalyst (i.e., a platinum ethylene complex) and an organic solvent (i.e., xylene), wherein the $Fe_3O_4$ nano-powder added to the polydimethylsiloxane is in an amount equal to 0.01% of the weight of the polydimethylsiloxane, the hydrogen silicone oil is added in an amount equal to 1% of the weight of the polydimethylsiloxane, and the platinum ethylene complex is added in an amount equal to 0.05% of the weight of the polydimethylsiloxane. The rest are the same as those in the examples 1-3.

Example 6

Please see FIGS. 2 and 3. Compared with the example 1, 2 or 3, in the example 6, the microporous channel barrier layer 3 is an organic sealant, and the organic sealant is filled in micropores in the surfaces of the metal ohmic electrodes 2 bonded to the two sides of the thermal sensitive ceramic plate 1, and the voids 11 (shown in FIG. 3) in the surfaces of peripheral edge regions of the thermal sensitive ceramic plate 1, where no metal ohmic electrode 2 is arranged, are sealed (that is, "filled and sealed") at the same time. In this example, the filling and sealing method for filling organic sealant in the micropores in the surfaces of the metal ohmic electrodes 2 bonded to the two sides of the thermal sensitive ceramic plate 1, and sealing the voids 11 in the surfaces of the peripheral edge regions of the thermal sensitive ceramic plate 1 where no metal ohmic electrode 2 is arranged at the same time is as follows: placing the thermal sensitive ceramic plate 1 with the metal ohmic electrodes 2 bonded on the two sides thereof into a hot isostatic press that contains the organic sealant as a void sealing medium, and applying pressure to the hot isostatic press, with the following process parameters: the temperature of the void sealing medium is controlled to be 100° C., the applied pressure is controlled to be 1 MPa, and the applied duration is controlled to be 120 min.; then cleaning and drying the surfaces sequentially after the pressure application is finished. In this example, the raw materials of the organic sealant include: polydimethylsiloxane, nano-powder of a transition metal oxide (i.e., $Co_3O_4$ nano-powder), a crosslinking agent (i.e., hydrogen silicone oil), a catalyst (i.e., a platinum ethylene complex) and an organic solvent (i.e., xylene), wherein the $Co_3O_4$ nano-powder added to the polydimethylsiloxane in an amount equal to 0.006% of the weight of the polydimethylsiloxane, the hydrogen silicone oil is added in an amount equal to 3% of the weight of the polydimethylsiloxane, and the platinum ethylene complex is added in an amount equal to 0.1% of the weight of the polydimethylsiloxane. The rest are the same as those described in the examples 1-3.

Example 7

In this example, only the filling and sealing method for filling the organic sealant in the micropores in the surfaces of the metal ohmic electrodes 2 bonded to the two sides of the thermal sensitive ceramic plate 1, and sealing the voids 11 in the surfaces of the peripheral edge regions of the thermal sensitive ceramic plate 1 where no metal ohmic electrode 2 is arranged at the same time is achieved with the following alternative method: placing the thermal sensitive ceramic plate 1 with the metal ohmic electrodes 2 bonded on the two sides thereof into a container that contains the organic sealant as described in the examples 4-6 for impregnation, with the following process parameters: the degree of vacuum is lower than 10 KPa, and the impregnation duration is preferably controlled to be 280 to 320 min., more preferably 290 to 310 min., optimally 300 min. (300 min. is selected in this example); after the impregnation, the surface is ultrasonically cleaned with an ultrasonic cleaner. The rest are the same as those described in the example 4, 5 or 6.

Preparation Example 2 (i.e., Preparation Method 2)

First, metal ohmic electrodes 2 are bonded to the two sides of the barium lead titanate-based and sintered thermal sensitive ceramic plate 1 described in any of the examples 4-7, and then an organic sealant that serves as the microporous channel barrier layer 3 is filled in the micropores in the surfaces of the metal ohmic electrodes 2, and the voids in the peripheral regions of the thermal sensitive ceramic plate 1 where no metal ohmic electrode 2 is arranged are sealed at the same time, so as to obtain the positive temperature coefficient ceramic thermistor element having strong reducing atmosphere resistance as shown in FIG. 2.

While the present invention is further detailed above in some preferred embodiments, the implementation of the present invention is not limited to the above description. Various simple derivations or replacements may be made by those having ordinary skills in the art without departing from the concept of the present invention, but all such simple derivations or replacements shall be deemed as falling in the technical scope of the present invention.

Performance Test

The following performance test is only for the positive temperature coefficient ceramic thermistor elements having strong reducing atmosphere resistance obtained in the examples 1 and 4-5, excluding the positive temperature coefficient ceramic thermistor elements having strong reducing atmosphere resistance obtained in the other examples, because, on one hand, testing the products obtained in the examples 1 and 4-5 is enough to reflect and prove the expected technical effects; on the other hand, the products obtained in the other examples also have technical effects not inferior to those of the products obtained in the examples 1 and 4-5; thus, unnecessary repetitive description is omitted to avoid a lengthy specification. In addition, the product structure in the state of test (i.e., the tested state) shown in FIG. 4 is essentially the product structure obtained in the examples 4-5, and the testing method for the product obtained in the example 1 is also the same and what need to do is just to replace the products obtained from different examples.

Figure 4:
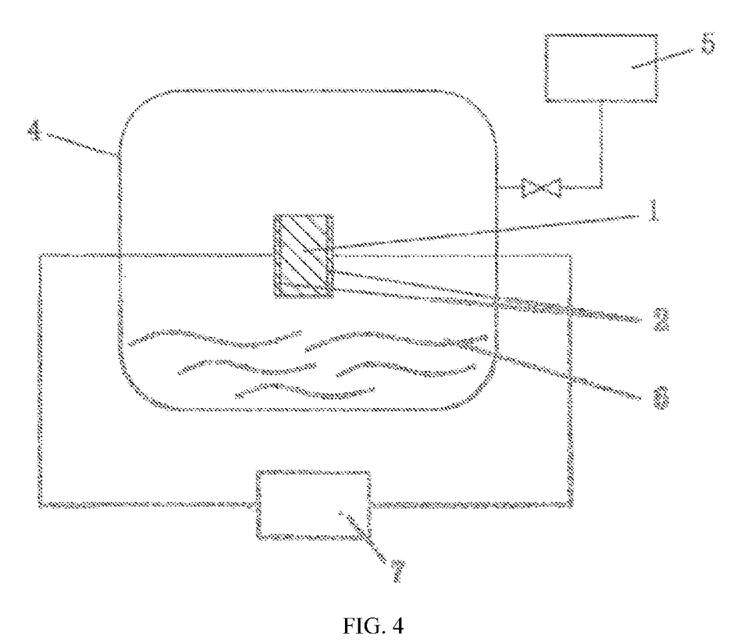
FIG. 4 is a schematic diagram of a reducing atmosphere testing device for the positive temperature coefficient ceramic thermistor element having strong reducing atmosphere resistance in the present invention.

Please see FIG. 4. The performance test system for a PTC ceramic thermistor element in reducing atmosphere includes a vacuum container 4, a vacuum pump 5, a volatile reducing solvent 6 and a stabilized power supply 7.

Preferably, the volume of the vacuum container 4 is about 10,000 $cm^3$, and 50 g 100% acetone reagent is contained in the vacuum container 4.

The positive temperature coefficient ceramic thermistor element having strong reducing atmosphere resistance obtained in the examples in the present invention is placed into the performance test system, and the vacuum container 4 is vacuumized to 20 kPa (negative pressure) with the vacuum pump 5. More specifically, for the element, 270V power frequency voltage is continuously applied to the metal ohmic electrodes 2 on the two sides, till the element is damaged and fails, and the failure time is recorded.

The specific implementation method is as follows: Among the PTC ceramic thermistor elements prepared in the same batch, elements having similar zero power resistance at room temperature are selected, a half of selected elements are sealed, while the other half of the selected elements are not sealed; then, a reducing resistance test is carried out on the selected elements in the performance test system at the same time. A result of comparison is shown in the following tables.

The result demonstrates that the PTC ceramic thermistor element provided by the present invention has a strong reducing resistance property.

Table of Performance Test on the Product Obtained in Example 1

| Sample No. | Type of Sample | Resistance Value (kΩ) | Breakdown Time (min.) |
|---|---|---|---|
| 1 | Example of the present invention | 1.1 | >2880 |
|   | Conventional product | 1.3 | 6 |
| 2 | Example of the present invention | 1.8 | >2880 |
|   | Conventional product | 1.7 | 9 |
| 3 | Example of the present invention | 3.1 | >2880 |
|   | Conventional product | 3.1 | 11 |
| 4 | Example of the present invention | 2.8 | >2880 |

Table of Performance Test on the Product Obtained in Example 1

| Sample No. | Type of Sample | Resistance Value (kΩ) | Breakdown Time (min.) |
|---|---|---|---|
|  | Conventional product | 2.9 | 15 |
| 5 | Example of the present invention | 1.6 | >2880 |
|  | Conventional product | 1.5 | 8 |
| 6 | Example of the present invention | 1.2 | >2880 |
|  | Conventional product | 1.3 | 8 |
| 7 | Example of the present invention | 2.6 | >2880 |
|  | Conventional product | 2.6 | 12 |
| 8 | Example of the present invention | 3.2 | >2880 |
|  | Conventional product | 3.3 | 18 |
| 9 | Example of the present invention | 2.3 | >2880 |
|  | Conventional product | 2.2 | 12 |
| 10 | Example of the present invention | 2.5 | >2880 |
|  | Conventional product | 2.5 | 9 |

Table of Performance Test on the Product Obtained in Example 4

| Sample No. | Type of Sample | Resistance Value (kΩ) | Breakdown Time (min.) |
|---|---|---|---|
| 1 | Example of the present invention | 1.3 | >2880 |
|  | Conventional product | 1.3 | 5 |
| 2 | Example of the present invention | 1.6 | >2880 |
|  | Conventional product | 1.7 | 9 |
| 3 | Example of the present invention | 2.2 | >2880 |
|  | Conventional product | 2.3 | 10 |
| 4 | Example of the present invention | 2.8 | >2880 |
|  | Conventional product | 2.7 | 13 |
| 5 | Example of the present invention | 1.5 | >2880 |
|  | Conventional product | 1.6 | 7 |
| 6 | Example of the present invention | 3.3 | >2880 |
|  | Conventional product | 3.3 | 16 |
| 7 | Example of the present invention | 2.6 | >2880 |
|  | Conventional product | 2.5 | 11 |
| 8 | Example of the present invention | 2.2 | >2880 |
|  | Conventional product | 2.3 | 14 |
| 9 | Example of the present invention | 3.3 | >2880 |
|  | Conventional product | 3.2 | 18 |
| 10 | Example of the present invention | 2.6 | >2880 |
|  | Conventional product | 2.5 | 7 |

Table of Performance Test on the Product Obtained in Example 5

| Sample No. | Type of Sample | Resistance Value (kΩ) | Breakdown Time (min.) |
|---|---|---|---|
| 1 | Example of the present invention | 2.1 | >2880 |
|  | Conventional product | 2.3 | 9 |
| 2 | Example of the present invention | 1.7 | >2880 |
|  | Conventional product | 1.6 | 8 |
| 3 | Example of the present invention | 3.3 | >2880 |
|  | Conventional product | 3.3 | 18 |
| 4 | Example of the present invention | 2.8 | >2880 |
|  | Conventional product | 2.7 | 14 |
| 5 | Example of the present invention | 1.6 | >2880 |
|  | Conventional product | 1.7 | 8 |
| 6 | Example of the present invention | 1.5 | >2880 |
|  | Conventional product | 1.6 | 9 |
| 7 | Example of the present invention | 2.6 | >2880 |
|  | Conventional product | 2.7 | 12 |
| 8 | Example of the present invention | 3.2 | >2880 |
|  | Conventional product | 3.1 | 21 |
| 9 | Example of the present invention | 1.3 | >2880 |
|  | Conventional product | 1.2 | 11 |
| 10 | Example of the present invention | 2.2 | >2880 |
|  | Conventional product | 2.3 | 9 |

The invention claimed is:

1. A positive temperature coefficient ceramic thermistor element having strong reducing atmosphere resistance, comprising a barium lead titanate-based and sintered thermal sensitive ceramic plate and metal ohmic electrodes located at two sides of the thermal sensitive ceramic plate, wherein the positive temperature coefficient ceramic thermistor element further comprises a microporous channel barrier layer, the microporous channel barrier layer comprises a glass sealing layer or an organic sealant, and, in the case that the microporous channel barrier layer is a glass sealing layer, the glass sealing layer is cladded on the outer surfaces of the thermal sensitive ceramic plate entirely, and the metal ohmic electrodes are bonded to the two sides of the glass sealing layer; whereas in the case that the microporous channel barrier layer is an organic sealant, the organic sealant is filled in micropores in the surfaces of the metal ohmic electrodes bonded to the two sides of the thermal sensitive ceramic plate, and the voids in the surfaces of peripheral edge regions of the thermal sensitive ceramic plate where no metal ohmic electrode is arranged are sealed at the same time; the glass sealing layer is obtained from glass paste for cladding, the glass paste for cladding is prepared as follows: preparing glass micro-powder in particle size smaller than 500 nm through a melting and water quenching process, while an organic substance is added therein and mixed at the same time, so as to obtain the glass paste for cladding for the glass sealing layer that is used as the microporous channel barrier layer; a mass ratio of the glass micro-powder in particle size smaller than 500 nm to the organic substance is 1:1.2, and the organic substance consists of the following raw materials in parts by weight (pbw): 0.1 to 0.3 pbw adhesive, 0.001 to 0.01 pbw dispersant, and 1 pbw solvent; the adhesive is PVB, the dispersant is low molecular wax, and the solvent is acetone; after the glass paste for cladding is cladded on the surface of the thermal sensitive ceramic plate by either method of impregnation method or spraying method, the thermal sensitive ceramic plate is placed in a high-temperature heat treatment device and heat-treated at 500 to 600° C. for 8 to 12 minutes; the glass sealing layer is a glass sealing layer of a glass system, the glass system consists of the following raw materials at the following molar ratio: $K_2SiF_6+ZnO+AL_2O_3+SiO_2+aM+N+\beta P$, where M is $Na_2O+K_2O$ and $\alpha=0.1$ to 0.3; N is one of $B_2O_3$, $Li_2O$ and $V_2O_5$ or a combination thereof, and the total amount is one mole; P is $MnO_2$, $Fe_3O_4$ or $Co_3O_4$, and $\beta=0.001$ to 0.01; the filling and sealing method for filing the organic sealant in the micropores in the surfaces of the metal ohmic electrodes bonded to the two sides of the thermal sensitive ceramic plate and sealing the voids in the surfaces of peripheral edge regions of the thermal sensitive ceramic plate where no metal ohmic electrode is arranged at the same time comprises either method of the following two methods: the first method: placing the thermal sensitive ceramic plate with the metal ohmic electrodes bonded on the two sides thereof into a hot isostatic press containing the organic sealant as a void sealing medium, applying pressure to the hot isostatic press, controlling the temperature of the void sealing medium as the pressure is applied, the applied pressure and the applied duration, and cleaning and drying the surfaces sequentially after the pressure application is finished; the second method: impregnating the thermal sensitive ceramic plate with the metal ohmic electrodes bonded on the two sides thereof in a container that contains the organic sealant, vacuumizing the container, controlling the degree of vacuum during vacuumizing and the impregnation duration, taking the ceramic plate out of the container after the bonding and vacuumizing, and cleaning and drying the surfaces sequentially; controlling the temperature of the void sealing medium during the application of pressure is that the temperature of the void scaling medium is controlled to be 100 to 200° C., controlling the applied pressure is that the pressure is controlled to be 1 to 10 MPa, and controlling the applied duration is that the applied duration is controlled to be 60 to 120 min.; controlling the degree of vacuum during the vacuumizing is that the degree of vacuum is controlled to be smaller than 10 KPa, and controlling the impregnation duration is that the impregnation duration is controlled to be 280 to 320 min.; and the surface cleaning is carried out with an ultrasonic cleaning machine; controlling the temperature of the void sealing medium during the application of pressure is that the temperature of the void sealing medium is controlled to be 100 to 200° C., controlling the applied pressure is that the pressure is controlled to be 1 to 10 MPa, and controlling the applied duration is that the applied duration is controlled to be 60 to 120 min.; controlling the degree of vacuum during the vacuumizing is that the degree of vacuum is controlled to be smaller than 10 KPa, and controlling the impregnation duration is that the impregnation duration is controlled to be 280 to 320 min.; and the surface cleaning is carried out with an ultrasonic cleaning machine; the composition of raw materials of the organic sealant comprises: polydimethylsiloxane, nano-powder of a transition metal oxide, a crosslinking agent, a catalyst, and an organic solvent; the nano-powder of the transition metal oxide added into the polydimethylsiloxane is in an amount equal to 0.001-0.01% of the weight of the polydimethylsiloxane; the crosslinking agent is added in an amount equal to 1-3% of the weight of the polydimethylsiloxane; and the catalyst is added in an amount equal to 0.05-0.1% of the weight of the polydimethylsiloxane.

2. The positive temperature coefficient ceramic thermistor element having strong reducing atmosphere resistance according to claim 1, wherein the composition of raw material of the thermal sensitive ceramic plate is: $(1-x-y)BaTiO_3+xPbTiO_3+yR+zS+wT$, where R is CaO, SrO or (CaO+SrO), S is $(BN+V_2O_3+Li_2CO_3+Al_2O_3)$, and T is one of trivalent rare carth oxide and pentavalent metal oxide or a combination thereof; and $x<0.5$, $y<0.1$, $z<0.05$ and $w=0.001$ to 0.005.

3. The positive temperature coefficient ceramic thermistor element having strong reducing atmosphere resistance according to claim 2, wherein the composition of raw material of the thermal sensitive ceramic plate further comprises 0.0001 to 0.0005 mol $MnN_2O_6$, $NiN_2O_6$ or $FeN_3O_9$.

4. The positive temperature coefficient ceramic thermistor element having strong reducing atmosphere resistance according to claim 2, wherein the trivalent rare earth oxide is one of $La_2O_3$, $Y_2O_3$ and $Sm_2O_3$ or a mixture thereof; and the pentavalent metal oxide is $Nb_2O_5$.

5. The positive temperature coefficient ceramic thermistor element having strong reducing atmosphere resistance according to claim 2, wherein the nano-powder of the transition metal oxide is nano-powder of $MnO_2$, $Fe_3O_4$ or $Co_3O_4$; the crosslinking agent is hydrogen silicone oil; the catalyst is a platinum ethylene complex; and the organic solvent is xylene.

6. The positive temperature coefficient ceramic thermistor element having strong reducing atmosphere resistance according to claim 5, wherein the glass sealing layer is in thickness of 2 to 5 μm.

7. The positive temperature coefficient ceramic thermistor element having strong reducing atmosphere resistance according to claim 1, wherein the glass sealing layer is in thickness of 2 to 5 μm.

8. A method for preparing the positive temperature coefficient ceramic thermistor element having strong reducing atmosphere resistance according to claim 1, comprising: first, cladding a glass sealing layer as a microporous channel barrier layer on the outer surfaces of a barium lead titanate-based and sintered thermal sensitive ceramic plate, and then bonding metal ohmic electrodes on the two sides of the glass sealing layer respectively; or, first bonding metal ohmic electrodes on the two sides of the barium lead titanate-based thermal sensitive ceramic plate, and then filling an organic sealant serving as a microporous channel barrier layer in the micropores in the surfaces of the metal ohmic electrodes, and sealing the voids in the surfaces of the peripheral edge regions of the thermal sensitive ceramic plate where no metal ohmic electrode is arranged at the same time, so as to obtain the positive temperature coefficient ceramic thermistor element having strong reducing atmosphere resistance; the glass sealing layer is obtained from glass paste for cladding, the glass paste for cladding is prepared as follows: preparing glass micro-powder in particle size smaller than 500 nm through a melting and water quenching process, while an organic substance is added therein and mixed at the same time, so as to obtain the glass paste for cladding for the glass sealing layer that is used as the microporous channel barrier layer; a mass ratio of the glass micro-powder in particle size smaller than 500 nm to the organic substance is 1:1.2, and the organic substance consists of the following raw materials in parts by weight (pbw): 0.1 to 0.3 pbw adhesive, 0.001 to 0.01 pbw dispersant, and 1 pbw solvent; the adhesive is PVB, the dispersant is low molecular wax, and the solvent is acetone; after the glass paste for cladding is cladded on the surface of the thermal sensitive ceramic plate by either method of impregnation method or spraying method, the thermal sensitive ceramic plate is placed in a high-temperature heat treatment device and heat-treated at 500 to 600° C. for 8 to 12 minutes; the glass scaling layer is a glass sealing layer of a glass system, the glass system consists of the following raw materials at the following molar ratio: $K_2SiF_6+ZnO+Al_2O_3+SiO_2+aM+N+\beta P$, where M is $Na_2O+K_2O$ and $\alpha=0.1$ to $0.3$; N is one of $B_2O_3$, $Li_2O$ and $V_2O_5$ or a combination thereof, and the total amount is one mole; P is $MnO_2$, $Fe_3O_4$ or $Co_3O_4$, and $\beta=0.001$ to $0.01$; the filling and sealing method for filing the organic sealant in the micropores in the surfaces of the metal ohmic electrodes bonded to the two sides of the thermal sensitive ceramic plate and sealing the voids in the surfaces of peripheral edge regions of the thermal sensitive ceramic plate where no metal ohmic electrode is arranged at the same time comprises either method of the following two methods: the first method: placing the thermal sensitive ceramic plate with the metal ohmic electrodes bonded on the two sides thereof into a hot isostatic press containing the organic sealant as a void sealing medium, applying pressure to the hot isostatic press, controlling the temperature of the void sealing medium as the pressure is applied, the applied pressure and the applied duration, and cleaning and drying the surfaces sequentially after the pressure application is finished; the second method: impregnating the thermal sensitive ceramic plate with the metal ohmic electrodes bonded on the two sides thereof in a container that contains the organic sealant, vacuumizing the container, controlling the degree of vacuum during vacuumizing and the impregnation duration, taking the ceramic plate out of the container after the bonding and vacuumizing, and cleaning and drying the surfaces sequentially; controlling the temperature of the void sealing medium during the application of pressure is that the temperature of the void sealing medium is controlled to be 100 to 200° C., controlling the applied pressure is that the pressure is controlled to be 1 to 10 MPa, and controlling the applied duration is that the applied duration is controlled to be 60 to 120 min.; controlling the degree of vacuum during the vacuumizing is that the degree of vacuum is controlled to be smaller than 10 KPa, and controlling the impregnation duration is that the impregnation duration is controlled to be 280 to 320 min.; and the surface cleaning is carried out with an ultrasonic cleaning machine; controlling the temperature of the void sealing medium during the application of pressure is that the temperature of the void sealing medium is controlled to be 100 to 200° C., controlling the applied pressure is that the pressure is controlled to be 1 to 10 MPa, and controlling the applied duration is that the applied duration is controlled to be 60 to 120 min.; controlling the degree of vacuum during the vacuumizing is that the degree of vacuum is controlled to be smaller than 10 KPa, and controlling the impregnation duration is that the impregnation duration is controlled to be 280 to 320 min.; and the surface cleaning is carried out with an ultrasonic cleaning machine; the composition of raw materials of the organic sealant comprises: polydimethylsiloxane, nano-powder of a transition metal oxide, a crosslinking agent, a catalyst, and an organic solvent; the nano-powder of the transition metal oxide added into the polydimethylsiloxane is in an amount equal to 0.001-0.01% of the weight of the polydimethylsiloxane; the crosslinking agent is added in an amount equal to 1-3% of the weight of the polydimethylsiloxane; and the catalyst is added in an amount equal to 0.05-0.1% of the weight of the polydimethylsiloxane.

* * * * *